United States Patent [19]

Konermann

[11] Patent Number: 5,281,375
[45] Date of Patent: Jan. 25, 1994

[54] PROCESS AND DEVICE FOR PRODUCING BUBBLE-FILM

[76] Inventor: Stefan Konermann, Wiesenstrasse 2, D-4540 Lengerich, Fed. Rep. of Germany

[21] Appl. No.: 793,365
[22] PCT Filed: Jun. 19, 1990
[86] PCT No.: PCT/EP90/00969
§ 371 Date: Feb. 12, 1992
§ 102(e) Date: Feb. 12, 1992
[87] PCT Pub. No.: WO90/15707
PCT Pub. Date: Dec. 27, 1990
[51] Int. Cl.⁵ .................. B29C 47/88; B29C 47/92
[52] U.S. Cl. .................. 264/40.3; 264/40.6; 264/519; 264/569; 264/568; 425/72.1; 425/141; 425/326.1; 425/143
[58] Field of Search .......... 264/40.1, 40.6, 40.4, 264/563-566, 40.3, 519, 569, 568; 425/141, 143, 144, 326.1, 72.1

[56] References Cited

U.S. PATENT DOCUMENTS

| 4,209,475 | 6/1980 | Herrington et al. | 264/40.6 |
| 4,443,400 | 4/1984 | Herrington | 425/326.1 |
| 4,472,343 | 9/1984 | Kawamura et al. | |
| 4,834,924 | 5/1989 | D'Annunzio et al. | 264/40.6 |

FOREIGN PATENT DOCUMENTS

| 0062909 | 10/1982 | European Pat. Off. |
| 253216 | 7/1987 | European Pat. Off. |
| 0264062 | 4/1988 | European Pat. Off. |
| 2658518 | 6/1978 | Fed. Rep. of Germany |
| 3336181 | 4/1985 | Fed. Rep. of Germany |
| 3623548 | 1/1988 | Fed. Rep. of Germany |
| 3627129 | 1/1988 | Fed. Rep. of Germany |
| 3634535 | 4/1988 | Fed. Rep. of Germany |
| 3707826 | 9/1988 | Fed. Rep. of Germany |
| 3802146 | 2/1989 | Fed. Rep. of Germany |

OTHER PUBLICATIONS

Plesske, "Schlauchfolienkuhlung-Entwicklungsstand und Auswirkung von Fehlern auf die Folienqualitat," Kunststoffe, vol. 69, No. 4, pp. 208-214 (1979).

Primary Examiner—Jeffery Thurlow
Assistant Examiner—Mathieu Vargot
Attorney, Agent, or Firm—Fish and Richardson

[57] ABSTRACT

The invention relates to a process for the film correction of the thickness profile of a blown portion in the production of bubble film in which the flow of cooling air is varied in individual peripheral regions of the film bubble. According to the invention, at least part of the cooling air is taken via an exit slot which is divided into individual separately fed segments in the peripheral direction of the film bubble and the supply of additional cooling air via the exit slot is, for example, controlled per segment using radial blowers. In this manner it is possible accurately to regulate the cooling action and thus the film thickness in the individual peripheral regions of the film bubble.

18 Claims, 9 Drawing Sheets

PROCESS AND DEVICE FOR PRODUCING BUBBLE-FILM

BACKGROUND OF THE INVENTION

The invention relates to methods and devices for manufacturing blown films.

In conventional methods for manufacturing blown films, relatively major fluctuations in film thickness occur which can be as great as 20% depending on the film thickness and the quality of the manufacturing installation. These fluctuations in thickness have a variety of causes, for example the inhomogeneity of the melt, temperature differentials in the melt and hence in the tool, and mechanical defects and adjustment errors of the tool and the cooling system. It is known that the film thickness can be controlled by changing the flowrate of the melt within the tool by controlled heating or cooling of the tool in certain circumferential areas. However, the corresponding devices and tools are very expensive, and a regulating system operating in accordance with this method for correction of film thickness is relatively slow, since long delays occur during the heating and cooling of the tool areas.

German Patent 3,627,129 teaches a method of the type recited at the outset in which the film thickness is influenced by controlling the cooling air stream. This method makes use of the fact that hotter areas of the film bubble in the cooling zone between the nozzle and the frost line undergo greater stretching because of the lower viscosity of the melt than do the cooler areas, so that the thickness of the film can be increased by more intensive cooling and reduced by less cooling. To control the cooling air stream, a plurality of pins is distributed on the circumference of the cooling ring near the air outlet, and the flow resistance in the individual circumferential areas of the cooling ring is varied, with the pins, which act as interfering elements in the cooling air flow being extended to a greater or lesser degree. The effect of such interfering elements on the cooling air flow is described in Plesske: "Blown Film Cooling: Developmental Status and Effect of Defects on Film Quality," in *Kunststoffe*, Vol. 69, No. 4, pages 208 to 214, 1979.

As the cooling air flows around the interfering elements, it is vorticized behind the interfering elements and uncontrollable local fluctuations in the cooling air flow are generated at the die gap, so that a uniform film thickness can be obtained only with difficulty.

Another problem consists in the fact that the increase in flow resistance produced by the interfering elements results in an increased backpressure upstream of the interfering elements at one point on the circumference, so that the air throughput is increased in the adjacent circumferential areas. Hence, a complicated system of interactions exists between the cooling air throughputs in the various circumferential areas which is difficult to control by regulation. Because of this problem, it is difficult to control interfering elements on the basis of areas in such fashion that the thickness profile of the film is regulated in a closed regulating circuit.

DE-OS 36 23 548 teaches a method in which the cooling air is supplied through two annular die gaps. The two die gaps are provided with separate cooling air supply devices, so that the air throughputs through the two die gaps can be controlled independently of one another. In the device proposed for working this method has an essentially uniform flow profile in the circumferential direction of the die gaps, however.

DE-A-26 58 518 describes a method with the general features of the invention. In this method, the thickness profile of the film is regulated with the aid of a crown of correcting air nozzles, in which the cooling air throughput is controllable with the aid of a valve for each. However, since the individual correcting air nozzles are supplied by a common annular line, adjustment of a single valve results in a change in the pressure distribution in the annular line and hence to undesired feedback effects on the throughput through the adjacent correcting air nozzles. This makes regulation of the complete system difficult.

U.S. Pat. No. 4,443,400 teaches a device by which a greater film thickness can be set in certain circumferential areas of the film. For this purpose, additional air nozzles are provided in the circumferential areas in question, each of said nozzles being connected by a common valve with the annular chamber of the cooling ring. If the valve is opened further, the total flow resistance in the circumferential area in question decreases, and a greater total volume of cooling air is discharged through the die gap of the cooling ring and through the additional nozzles.

U.S. Pat. No. 4,209,475 teaches a device by which the thickness profile can be controlled in such fashion that the width of the die gap of the cooling ring can be narrowed segmentwise. Here again however, undesirable interactions between adjacent segments occur, since the narrowing of the gap in one segment results in an increased cooling air throughput in the adjacent segments.

The goal of the invention is to control the cooling air flow in such fashion that an independent, sensitive, and rapid modification of the cooling effect is possible in the individual circumferential areas of the film bubble and extreme local fluctuations in the cooling effect are avoided.

Solutions according to the invention are described in the independent claims.

According to the basic idea of the invention, at least one cooling ring divided into individual circumferential segments is provided, and the cooling air streams in the individual segments are controlled or regulated independently of one another. In the proposed solutions, assurance is provided by supplementary measures that the cooling air throughputs in the individual segments do not influence one another and that no abrupt changes in the cooling effects occur over the circumference of the cooling ring.

The principle of the solution is that a main cooling air stream is generated with the aid of a conventional cooling ring, in which stream the flowrate of the air over the entire circumference of the film bubble is as uniform as possible and that deliberate local modifications in cooling effect are achieved by either supplying additional cooling air through a separate air gap or drawing off a portion of the main cooling air. The highly efficient and correspondingly slow cooling air blower to generate the main cooling air stream can therefore be operated at a constant backpressure while the flows in the individual circumferential segments of the additional air gap can be varied rapidly because of the low throughput, so that delicate control of the circumferential distribution of the total cooling air flow becomes possible. In addition, the uniform main cooling air stream erases the differences in throughput between the individual circumferential sections of the additional air gap to a certain extent, so that excessive disturbances of the total cooling air stream and abrupt local changes in cooling effect are avoided.

Since the method according to the invention requires no special design of the cooling ring that serves to generate the main cooling air stream, the method can be worked by suitable retrofitting, even in existing blown film machinery.

The method also has the advantage that the addition of additional cooling air improves the cooling effect overall and allows a corresponding increase in the efficiency of the system. Moreover, an increase in cooling efficiency is achieved by the fact tilat the air flow is more strongly vorticized by blowing the additional cooling air into the main cooling air stream. The initially turbulent upwardly directed main cooling air stream, because of the decreasing flowrate, normally changes to a laminar flow as it moves upward, so that the cooling effect decreases sharply upward. The addition of the additional cooling air at a suitable level can generate new turbulence so that the effective cooling area is increased. Changing the cooling effect is then accomplished without a considerable change in the flowrate and pressure, so that a stable bubble position can be ensured.

The increase in cooling effect can be controlled not only by modifying the throughput of the cooling air supplied through the additional air gap but alternatively, or in addition, by segmental changing of the angle of incidence of the additional cooling air. Optionally, the positions of the individual segments relative to the film bubble in the vertical or radial direction can be varied.

A further increase in the sensitivity during control of the circumferential distribution of the cooling effect can be achieved by supplying precooled air through the additional air gap. In this case, the circumferential distribution of the cooling effect can also be controlled by segmental modification of the temperature of the additional cooling air. This solution can be implemented structurally, for example, by supplying cooled and uncooled different amounts to the individual segments of the additional air gap through mixing valves or by spraying a coolant into the additional air flow.

Optionally, instead of using air, other cooling gases with different heat capacities may be used so that the circumferential distribution of the cooling effect can also be controlled by the composition of the gas mixture.

An important advantage of the solutions described above also consists in the fact that, because of the separate supply of cooling air or cooling gas to the individual segments of the additional air gap and because of the separate exhaustion of the air in the individual segments, influence of the additional cooling air streams on one another is avoided. This permits stable regulation of the thickness profile in a closed regulating circuit.

In another solution, a portion of the cooling air stream is separated at positions distributed circumferentially on the cooling ring, at the die gap or upstream thereof, and the quantity of cooling air thus deflected is controlled by adjustable guide blades or guides.

By separating a portion of the cooling air, the throughput at the die gap can be controlled with precision and a high backpressure can be prevented from developing upstream of the divergence point and the cooling air escapes through adjacent circumferential areas. Changing the position of the guide blades in one circumferential area hence has no effect on throughput in the other circumferential areas. In addition, diverting the cooling air prevents the flowrate from increasing as it flows around the guide blades and produces a strong vorticization downstream from the guide blades. Adjusting the guide blades therefore permits simple, accurate control of the circumferential distribution of the cooling air throughput and hence the thickness profile of the film bubble.

In one preferred embodiment of the device, the upper wall of the cooling ring is surrounded by a crown of exit openings for the diverted cooling air, and each individual exit opening has a guide blade associated therewith which projects from above into the interior of the cooling ring and deflects a portion of the cooling air into the exit opening. The positions of the guide blades can be adjusted vertically so that the volume of diverted cooling air can be varied.

It is possible in this embodiment to divide the cooling ring into individual segments using radial partitions so that the cooling air streams are separated from one another before they reach the die gap or a position a short distance upstream from the die gap. In this manner, the throughput differences between the individual segments downstream from the guide blades are prevented from equalizing once more and the exit openings and guide blades can be located relatively far out on the cooling ring leaving more space for the adjusting mechanisms.

In another embodiment, the guide blades are formed by a lip of flexible material which is continuous in the circumferential direction, the angle of incidence of said lip being adjustable in the individual circumferential areas with the aid of rams or the like. This design provides structural simplification and it is possible to make the shape of the lip streamlined in such a manner that vorticization of the cooling air downstream from the lip is avoided. In addition, in this design discrete transitions in the circumferential distribution of cooling air flow are avoided.

Adjustment of the guide blades and/or rams can be accomplished manually using adjusting screws or the like or with the aid of suitable drives, for example electromagnetic, pneumatic, or piezoelectric adjusting elements. In the latter case it is possible to regulate the cooling air throughput in the individual circumferential areas on the basis of the film thickness measured at various points on the circumference of the film bubble. Since the changes undertaken within the scope of regulation affect the settings of the guide blades only in the affected circumferential area and have no significant feedback on the other circumferential areas, the settings of the regulating system, in other words the positions of the guide blades, are largely decoupled, so that the tendency of the regulating system to oscillate is reduced and stable regulation is made possible.

To reduce even further the influence of the cooling air streams on one another, it can be advantageous to control the flow resistances for the air streams diverted through the outlet openings in such fashion that they correspond to the flow resistance of the die gap of the cooling ring for every position of the guide blades. In this manner, the flow and pressure conditions in the distribution chamber at the outer circumference of the cooling ring can remain practically completely unaffected by the adjusting movements of the guide blades. Adjustment of the flow resistance can be accomplished with the aid of electromagnetically controlled metering valves and the like. However, it is also optionally possible to couple the guide blades mechanically with a throttle part that narrows the corresponding outlet opening to a greater or lesser degree depending on the position of the guide blades.

The cooling effect in the individual segments of the cooling ring can also be varied in such fashion that the flowrate of the cooling air is controlled by narrowing or expanding the die gap. For a given throughput, increasing the flowrate produces an increase in the cooling action. This principle forms the basis of another embodiment. A nearly constant throughput is achieved by virtue of the fact that the change in flow resistance caused by the change in the gap width is compensated by a greater or lesser throttling of the flow upstream of the die gap. This solution has the advantage that the total cooling air throughput in each circumferential segment remains constant. In this manner, a local reduction of the aftercooling of the film bubble above the frost line is prevented and assurance is provided that the film temperature will have decreased everywhere when the film is flattened and wound up so that the film layers will not stick to one another. Because of the uniformly high aftercooling effect, the length of the aftercooling section can be reduced and/or film ejection can be increased.

When working with one of the two solutions described above with a die gap that is divided into individual segments, the disturbances in the cooling air flow produced by the partitions can have different effects on the cooling capacity. As tests have shown, in the case of a die gap which is located close to the film bubble, the vortices produced by the partitions result in intensification of the cooling effect and hence thickening of the film. If on the other hand the die gap is located further from the film bubble, the influences of the different flowrates of the laminar exit flow will predominate. With a uniform width of the die gap, a squared velocity profile is obtained in the circumferential direction, so that the speed in the vicinity of the partitions is less than in the middle of each individual segment. In this case, therefore, there is a reduced cooling effect in the vicinity of the partitions and a thinning of the film. Other embodiments propose various measures for avoiding these disturbing effects.

Preferred embodiments of the invention will now be described in greater detail with reference to the drawings.

DESCRIPTION OF THE PREFERRED EMBODIMENTS

Figure 1:
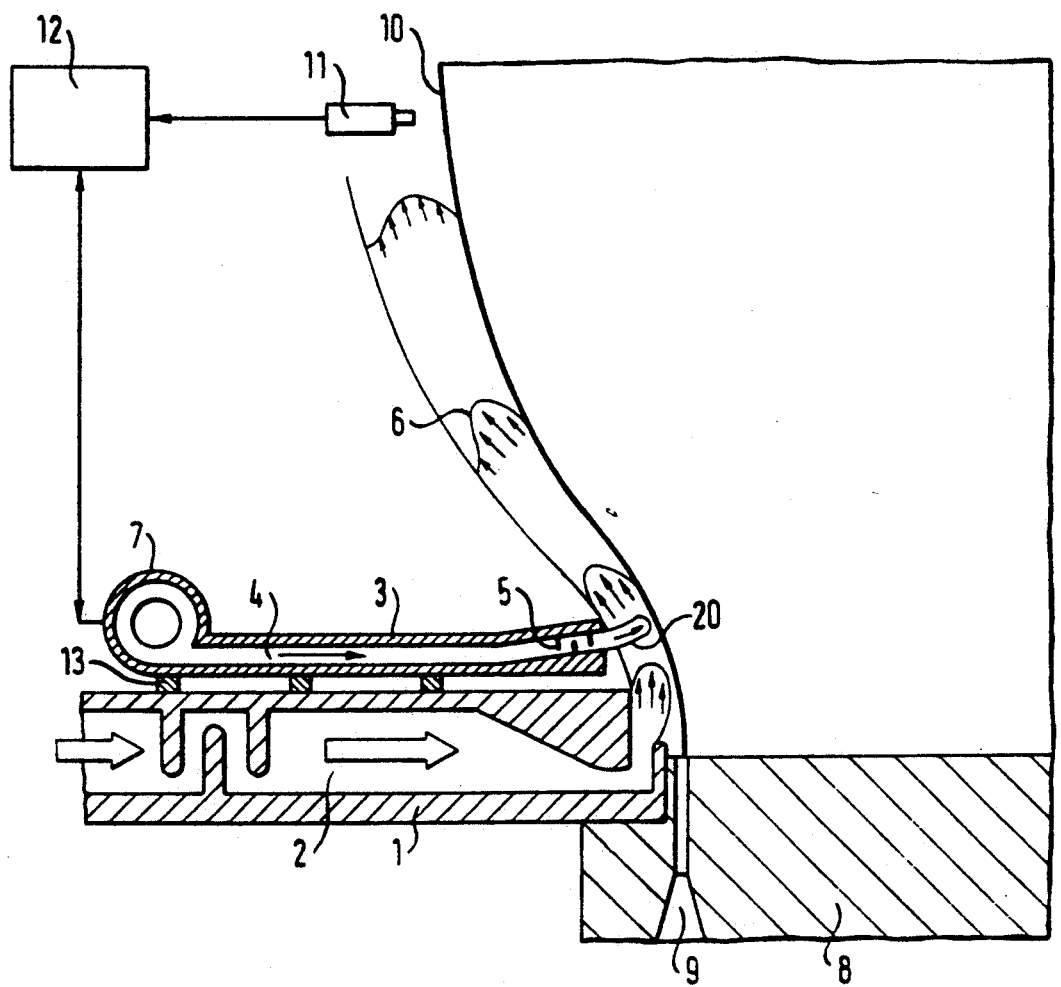
FIG. 1 shows a radial partial section through a cooling ring of a film blowing machine.

In a blown film machine according to FIG. 1, melt 9 is extruded from an annular die gap of a tool 8, so that a tubular film bubble 10 is formed. The tool is surrounded by a cooling ring 1, in which a main cooling air stream 2 is distributed uniformly around the circumference and discharged at the radially inner end through an upwardly directed die gap, so that film bubble 10 is blown with cooling air. The velocity distribution of the cooling air flow 6 at the circumference of film bubble 10 is symbolized in FIG. 1 by arrows and distribution curves.

An additional cooling ring 3 is mounted on bases 13 on the upper surface of cooling ring 1, through which ring 3, through an essentially radially directed die gap 20, additional cooling air 4 is blown in to main cooling air stream 6. Since additional cooling air 4 has a relatively high transverse component relative to the main cooling air stream, turburlence is generated or intensified in the cooling air stream at the circumference of film bubble 10, so that the air heated at the surface of the bubble is carried away more rapidly and the cooling effect is increased. The space formed by bases 13 between cooling ring 1 and additional cooling ring 3 makes it possible to exhaust additional air at the separation edge at the die gap of cooling ring 1.

Figure 2:
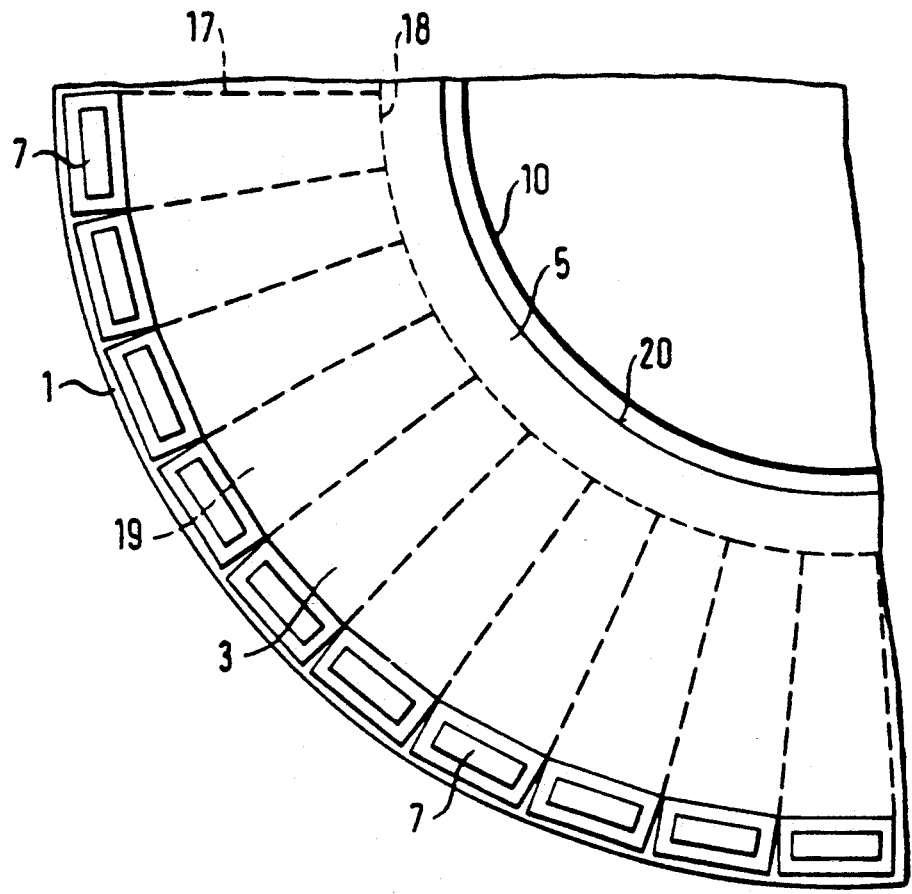
FIG. 2 shows a partial section through a cooling air deflecting device mounted on the cooling ring.

According to FIG. 2, additional cooling ring 3 is divided by radial partitions 17 into a plurality of individual segments 19, and a separate radial flow compressor 7 is provided for each individual segment to generate the additional cooling air stream. Each of the radial flow compressors 7 is driven separately by an electronically switched electric motor, permitting exact control of the rpm and hence the cooling air throughput in the segment in question.

Optical thickness sensors 11 are arranged at intervals above additional cooling ring 3 on the circumference of film bubble 10. With the aid of these thickness sensors, the thickness of the film is measured optically in the individual circumferential areas of the film bubble and a corresponding thickness signal is transmitted to a control device 12. Control device 12 controls the individual radial flow compressors 7 independently of one another. The cooling air throughput in the individual segments 19 of additional cooling ring 3 influences the cooling effeet and henee the stretehing of film bubble 10 in the individual eireumferential areas, and the resultant film thickness is fed back by thickness sensors 11 as a feedback signal to control unit 12, so that the thickness profile of film bubble 10 is regulated in a closed circuit. Instead of a plurality of thickness sensors, a single sensor movable in the circumferential direction can also be provided.

Figure 4A:
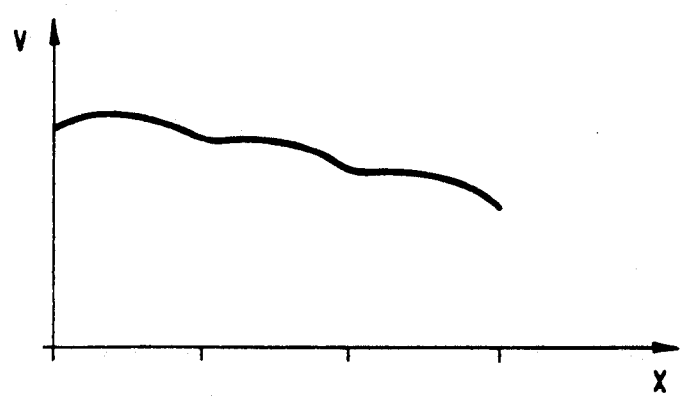
Figure 4B:
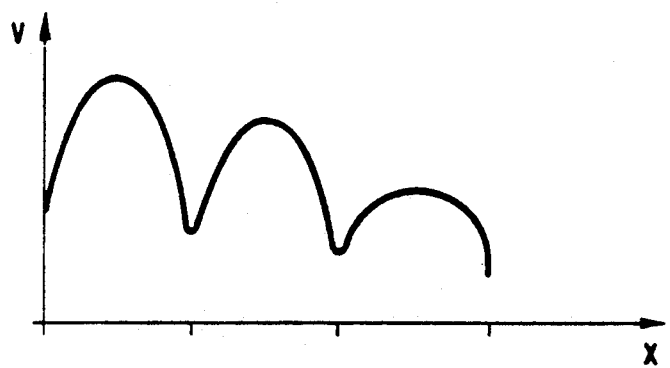
Figure 4C:
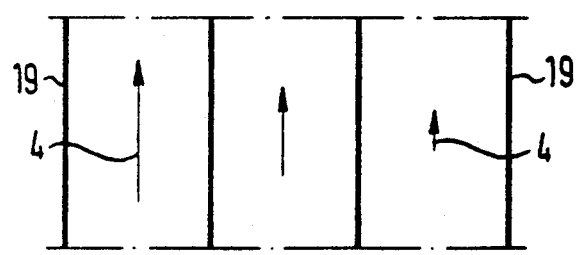

The radial partitions 17 provided in the interior of additional cooling ring 3 extend as far as a circle designated in FIG. 2 by reference 18 in the immediate vicinity of die gap 20, so that the cooling air flows generated with the aid of the individual radial flow compressors 7 do not influence one another. The cooling air streams 4 of the individual segments do not combine until a point immediately upstream of die gap 20, and a flow restriction stage 5 formed by labyrinthine ribs smooths the velocity distribution of the cooling air stream. The effect of flow restriction stage 5 is illustrated in FIGS. 4(A) to (c). FIG. 4(C) shows three segments 19 in which the additional cooling air streams 4 each have individual velocities, as indicated by the arrows of different lengths. Figure (B) shows the corresponding velocity distribution of the cooling air stream in circumferential direction x of the cooling ring upstream of flow restriction stage 5. FIG. 4(A) shows the smoothed velocity distribution at die gap 20. Suitable controlling radial flow compressor 7 permits the flowrate of the additional cooling air 4 at die gap 20 to be varied locally in such fashion that abrupt discontinuities in the velocity distribution are prevented. In this manner a uniform and precise regulation of the thickness profile of the film bubble is made possible.

Figure 3:
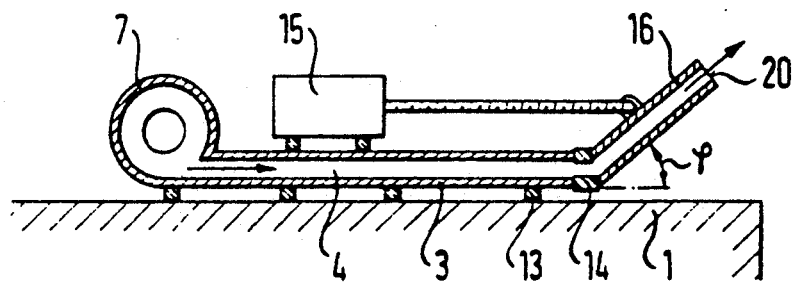
FIGS. 3 to 5 show sections through deflecting devices according to other embodiments of the invention.

FIG. 3 shows a modified embodiment of additional cooling ring 3. In this embodiment, each segment of the additional cooling ring is provided with a separate gap nozzle 16, connected by a flexible coupling 14 with the main part of additional cooling ring 3. With the aid of an adjusting element 15, the angle of incidence of gap nozzle 16 and hence the degree of turbulence generated in the main cooling air stream can be varied. In this embodiment therefore the cooling effect can be influenced solely or additionally with the aid of the angle of incidence of gap nozzles 16 of the individual segments.

Another embodiment of the invention will now be described with reference to FIGS. 5 to 12.

Figure 5:
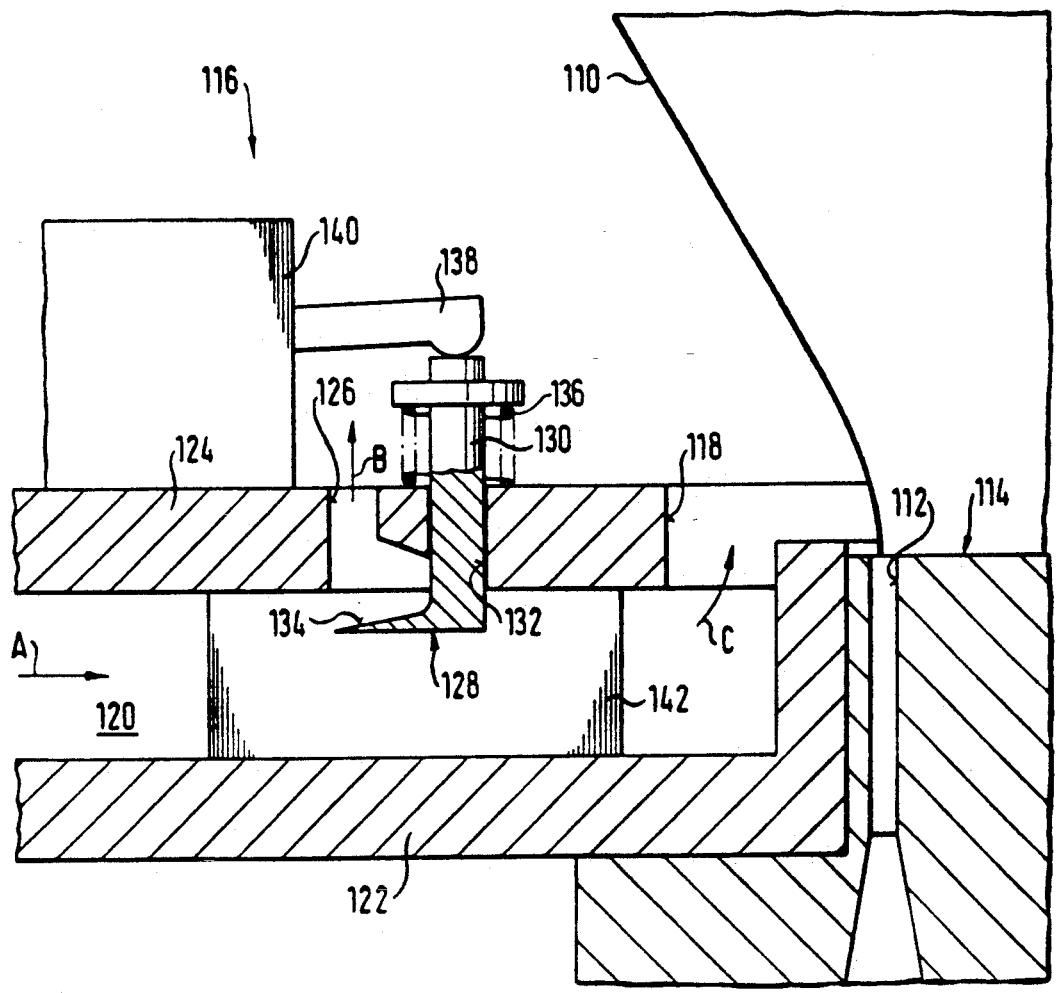

According to FIG. 5, a tubular film bubble 10 is extruded from an annular gap 112 of an extrusion tule 14. Extrusion tool 114 is surrounded by a cooling ring 116 through which cooling air is supplied to the circumference of film bubble 110 through an annular die gap 118.

Cooling ring 116 has an annular chamber 120 delimited by a lower wall 122 and an upper wall 124. In the outer circumferential area of the cooling ring, not shown in FIG. 5, annular chamber 120 is connected with an annular distribution chamber by a flow restriction stage, said chamber being connected to a blower. The cooling air supplied with the aid of the blower is distributed in the distribution chamber so that a cooling air stream which is essentially uniform over the entire circumference enters annular chamber 120 through the flow restriction stage, as shown by an arrow A in FIG. 5.

The upper wall 124 of cooling ring 116 is provided radially outside the gap 118 with a crown of outlet openings 126 located close together. A guide blade 128 is associated with each outlet opening 126, said blades extending with a shaft 130 through a guide opening 132 in upper wall 124 of the cooling ring and having at their lower ends a guide contour 134 that merges smoothly with the expanded lower end of outlet opening 126. Shaft 130 of the guide blades is pretensioned upward by a spring 136 and acted upon by a lever 138 of an adjusting mechanism, said lever being located on the cooling ring in a housing 140 radially outside outward opening 126.

Guide blade 128 is shaped so that it closes outlet opening 126 in its upper end position, so that the cooling air can flow unimpeded to die gap 118. On the other hand if guide blade 128 is pressed downward by lever 138, guide contour 134 of the guide blade causes a portion of the cooling air to be deflected into outlet opening 126, so that a partial stream B is branched off main cooling air stream A. Hence, only the remaining partial stream C of cooling air reaches die gap 118, so that a reduced cooling air throughput is achieved at the die gap.

Outlet openings 126 and guide blades 128 located circumferentially are separated from one another by partitions 142 distributed radially in annular chamber 120. When two adjacent guide blades are set to different positions so that the cooling air throughputs downstream of the guide blades differ from one another, partition 142 prevents premature combination of partial streams C and equalization of the throughputs. In this manner, control of the circumferential distribution of the cooling air throughput at die gap 118 with high angular resolution is made possible although guide blades 128 and outlet openings 126 are located relatively far radially outside the die gap. The arrangement of the guide blades in a position that is located relatively far outward has the advantage that more space is available for the corresponding actuating mechanisms in housing 140 and the disturbances possibly caused by the guide blades can largely die out in the cooling air flow before they reach die gap 118. Partitions 142 are relatively thin and made with blade-shaped inner and outer ends so that they offer the smallest possible resistance to the cooling air flow.

In one modified embodiment, partitions 142 are made in the form of ribs projecting from upper wall 124, said ribs projecting only approximately as far as the maximum immersion depth of the guide blades in the interior of annular chamber 120, so that the cooling ring is segmented only in the upper area. In this manner, a high angular resolution in controlling the cooling air throughput can be achieved but the uninterrupted cooling air stream in the lower area of annular chamber 120 produces a certain stabilization of the circumferential distribution of the cooling air stream so that the disturbing influences of complete segmentation are avoided.

Guide blades 128 preferably occupy the entire space between the adjacent partitions 142, so that lateral flow around the guide blades is prevented and creation of vortices with vertical vortical axes behind the guide blades is avoided. The lower downstream ends of guide blades 128 are designed in the embodiment shown as separating edges, at which the cooling air stream separates.

If film bubble 110 has too great a thickness in the circumferential area that lies in the plane of the section in FIG. 5, guide blade 128 is pressed downward with the aid of lever 138 so that the diverted partial stream B is increased and the throughput at the die gap decreases accordingly. As a result the cooling effect is reduced in the circumferential area in question, so that the film material remains flowable for a longer time and becomes much thinner as the film bubble expands. Since the surplus cooling air is drained off through exit opening 126, this cooling air does not produce an increase in throughput in the adjacent circumferential areas. The throughput cross section of outlet opening 126 is chosen so that the total flow resistance, determined by the cross section of die gap 118, the position of guide blades 128, and the cross section of exit opening 126 changes as little as possible when the setting of guide blades 128 is modified. The pressure in the outer area of annular chamber 120, upstream from partitions 142, and in the upstream distribution chamber is therefore practically unaffected by the changes in the settings of the guide blades.

Optionally, a metering valve can be located at each of the outlet openings 126, said valve being controlled as a function of the position of guide blades 128, by means of which valve the flow resistance is adjusted to the position of the guide blades in such fashion that the total flow resistance is kept constant with greater accuracy. In this case it is possible to measure the flowrate upstream of guide blades 128 with the aid of a heated thermistor and to adjust the metering valve as a function of the measured flowrate in such a way that the desired flow resistance is obtained in every position of the guide blades.

Figure 6:
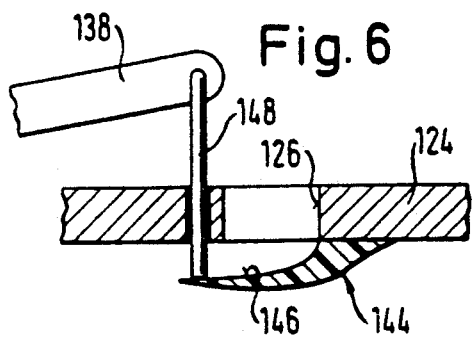
FIG. 6 shows a section through a cooling ring with a deflecting device mounted on the die gap.

FIG. 6 shows a partial section through the area of upper wall 124 of the cooling ring provided with outlet opening 126, in accordance with a modified embodiment of the invention. In this embodiment, instead of individual guide blades, a continuous annular lip 144 extending in the circumferential direction and made of flexible material is provided. Lip 144 is mounted on the inner surface of upper wall 124 of the cooling ring and forms a guiding contour 146 against which the edge of outlet opening 126 facing die gap 118 continuously abuts. The underside of lip 144 is made streamlined downstream from outlet opening 126, so that the cooling air flow to the die gap is not disturbed. The upstream end of lip 144 which is designed in the shape of a blade is urged by a ram 148 which in turn is connected with lever 138 of the adjusting mechanism. Lip 144 because of its natural elasticity is pretensioned into the closing position and can be deflected elastically with the aid of ram 148 in order to deflect a portion of the cooling air stream into outlet opening 126.

Since in this embodiment, apart from outlet opening 126, only a small hole is required for ram 148 in upper wall 124 of the cooling ring, an excessive weakening of the wall is avoided and the outlet openings can be located close together. For example, outlet openings 126 are separated from one another only by thin ribs, so that they act essentially like a continuous annular gap. Elastic lip 144 in the circumferential direction fits flush with the different positions of ram 148, so that abrupt changes in the cooling air flow at the circumference of the film bubble are avoided. Optionally, the continuous flexible lip can also have a profile that resembles the profile of guide blades 128 according to FIG. 5, but the shaft is made shorter and does not traverse upper wall 124 of the cooling ring, but is guided in a height-adjustable manner in a groove in wall 124. Wall 124 of the cooling ring in this case has only small openings in the vicinity of the groove for the rams for actuating the lip.

Figure 7:
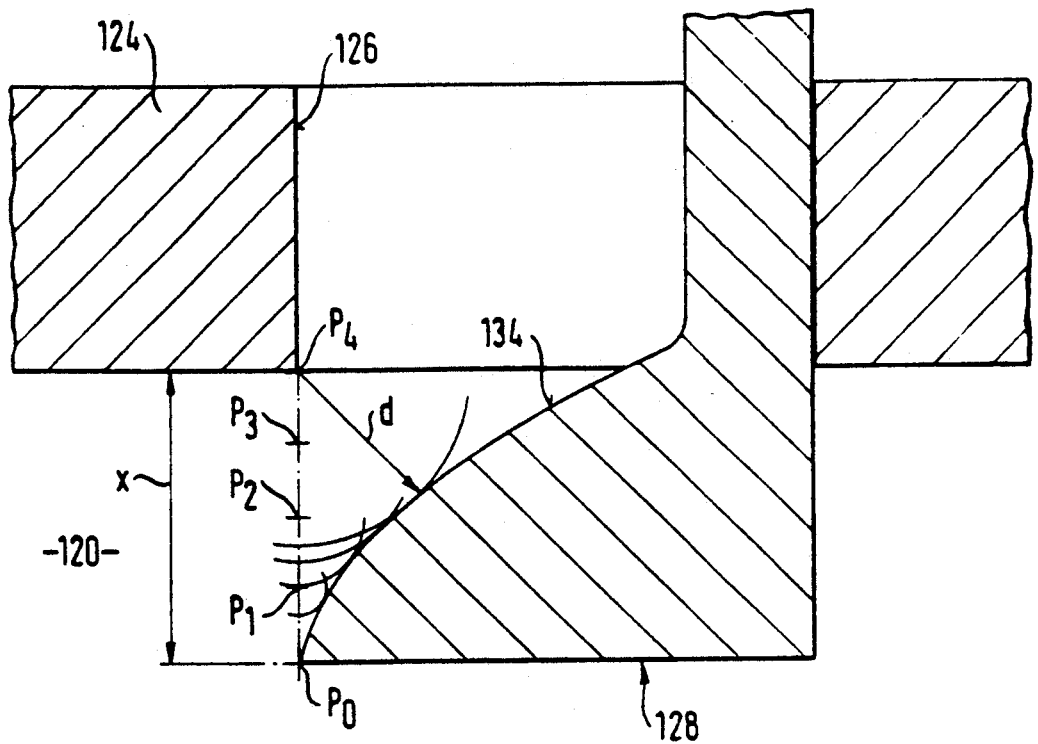
FIG. 7 shows a guide blade of the deflecting device according to FIG. 6, in a top view.

FIG. 7 shows a modification of the embodiment shown in FIG. 5. In the modified embodiment shown in FIG. 7, guide blade 128 has an approximately paraboloid guiding contour 134. The shape of guiding contour 134 is chosen so that a throttle is formed between the guiding contour and the edge of outlet opening 126 opposite it, the width b of said throttle depending on the immersion depth x of guide blades 128 in such a way that the total flow resistance is independent of the immersion depth of the guide blades. The shape of guiding contour 134 can be determined experimentally, but can also be derived approximately theoretically as well, as will be described briefly below. The following symbols are used:

x: immersion depth of guide blades
d(x): width of throttle
H: internal height of annular chamber 120 between the interior faces of walls 122 and 124 pressure in annular chamber 120 upstream from guide blades 128
P: pressure in annular chamber 120 upstream from guide blades 128
P': pressure in annular chamber 120 immediately downstream from the guide blades throughput through throttle and outlet 126 throughput through die gap 118
$Q_1$: throughput through throttle and outlet 126
$Q_2$: throughput through die gap 118
R: flow resistance of the part of the annular chamber and the die gap 118 located behind the guide blades As the gas flows through the narrow gap or a line, an approximately paraboloid velocity distribution is produced. The velocity is at its greatest in the middle of the gap and drops off to zero toward the boundary surfaces at the edges of the gap. The flow throughput is determined by integration of the velocity distribution over the gap width. The flow throughput is therefore proportional to the pressure differential and to the cube of the gap width. Hence the following relationships are valid:

$$Q_1(x) = a_1 P \cdot d(x)^3 \quad (1)$$

$$Q_2(x) = a_2 (P - P')(H - x)^3 \quad (2)$$

$$Q_2(x) = P'(x)/R \quad (3)$$

In these equations $a_1$, $a_2$, and R are system constants. With the aid of equation (3) P' can be eliminated from equation (2), obtaining an expression for $Q_2$ as a function of x. It is now necessary to ensure that at a constant pressure P the total flow resistance Q is independent of the immersion depth x of the guide blades, in other words:

$$Q_1(x) + Q_2(x) = Q \quad (4)$$

Substituting equations (1) to (3) in equation (4) and solving for d, we obtain a function for d(x) which fulfills the desired condition. Guide contour 134 can then be constructed with the aid of the method described below with reference to FIG. 7.

On a straight line running through points $p_0$ and $p_4$ in FIG. 3, various points $p_1$, $p_2$, $p_3$ are marked. A circle with radius $d(x_1)$ is described around each of points $P_i$ (i=1, 2, 3, 4), where $x_i$ is the distance of point $P_i$ from point $p_0$. The envelope curve of the resultant arc of a circle is the desired guiding contour 134.

Figure 8:
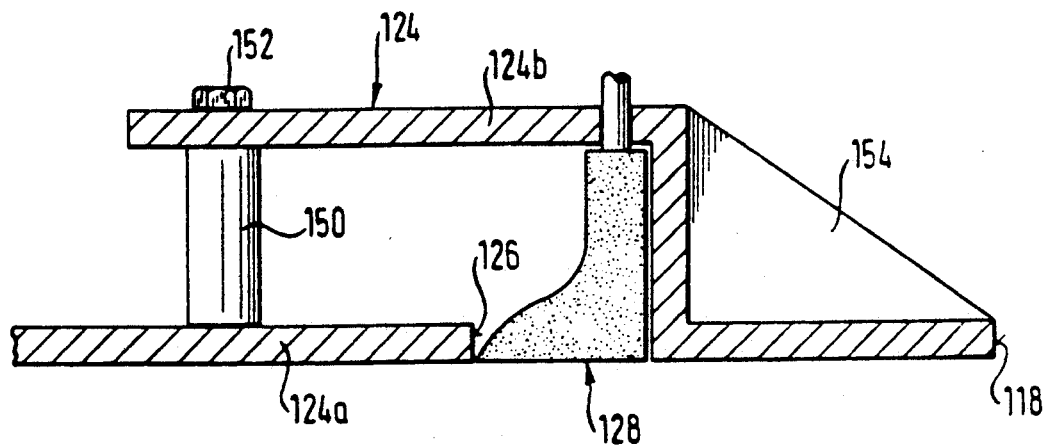
FIGS. 8 and 9 are sections through diversion devices according to other embodiments of the invention.

FIG. 8 shows a modified design of upper wall 124 of the cooling ring. This design makes it impossible to connect outlet openings 126 into a continuous annular gap, so that the circumferential distribution of the cooling air flow is not disturbed by ribs between the individual outlet openings 126. The upper wall 124 of the cooling ring as shown in FIG. 8 is formed by an outer ring 124a and an inner ring 124b with a stepped profile. Inner ring 124b is bolted at its outer circumferential edge to outer ring 124a and is held at a distance from outer ring 124a by spacers 150, so that the air escaping from the annular outward opening 126 can escape unimpeded. Guide blade 128 is guided on the step of inner ring 124b.

Inner ring 24b limits die gap 118 with its inner edge and is held exclusively by spacers 150 and bolts 152 to its outer circumferential edge. On the basis of the annular structure and the stepped profile possibly reinforced by ribs 154, the inner edge of inner ring 124b can nevertheless be held in a stable and vibration-free manner.

Guide blade 128 in this embodiment is preferably made as a continuous annular-shaped part made of elastic material.

Figure 9:
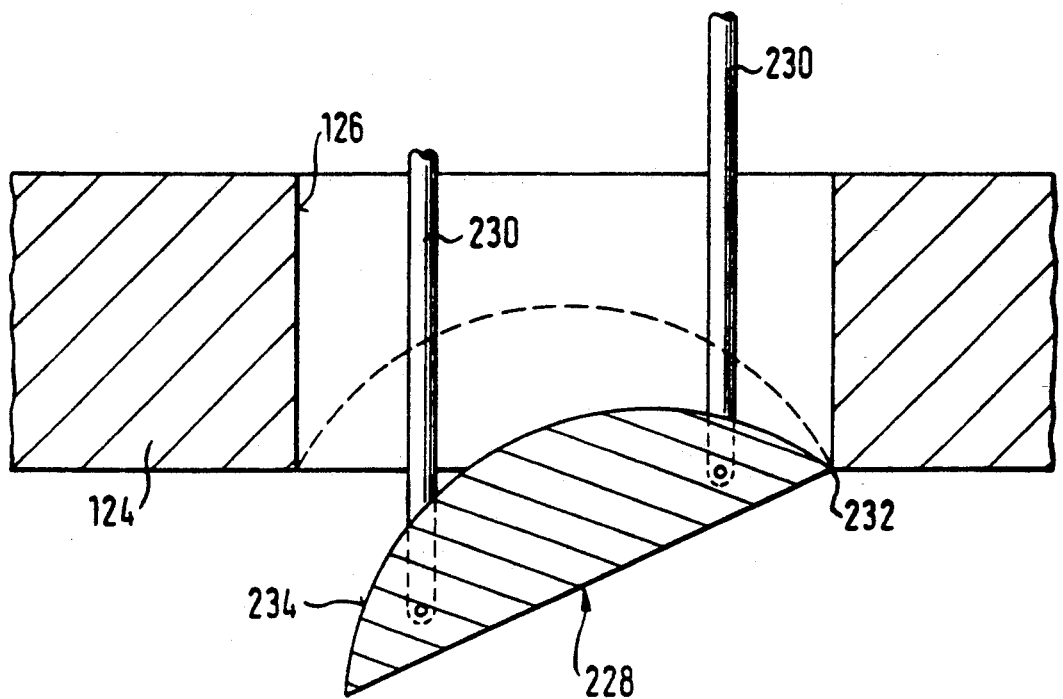

According to FIG. 9 a guide blade 228 is held pivotably in outlet opening 126 with the aid of a rod 230. Pivot axis 232 is formed by the edge (at the rear looking in the flow direction) of guide blade 228. Optionally, the guide blade can also be articulated with a hinge to the upper wall 124 of the cooling ring. As experiments have shown, in this embodiment the pressure upstream of the guide blades can be kept largely constant if the guide blades have a circular or circular-segment-shaped guiding contour 234, as shown in FIG. 9.

In another embodiment, not shown, the guide blade can also be designed as a guide element located in the annular chamber of the cooling ring, said guide element being rotatable around a vertical axis and provided in the manner of a stopcock with two passageways running at right angles to one another, one of which leads to the die gap and the other to outlet opening 126. Depending on the angular position of the guide element, a larger or smaller amount of air is tapped off through the outlet opening.

Figure 10:
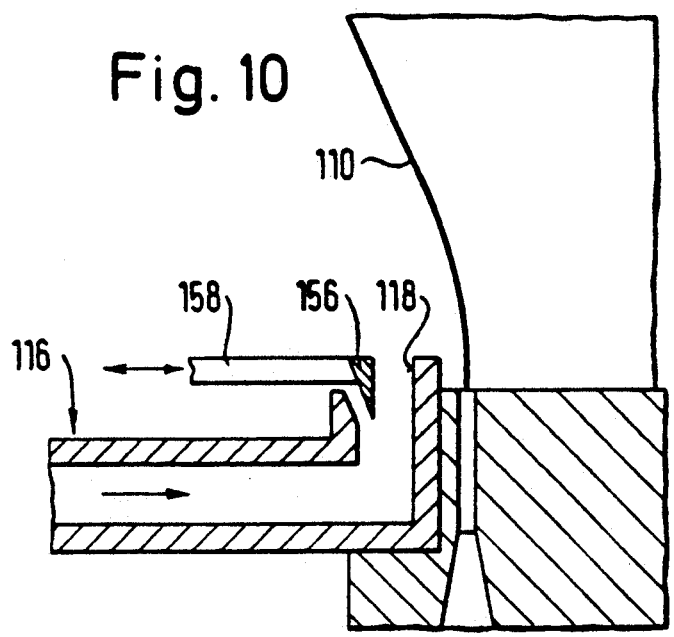
FIG. 10 is a section through a cooling ring with a diversion device mounted on the die gap.
Figure 11:
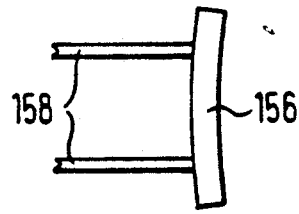
FIG. 11 is a guide blade of the diversion device according to FIG. 10 in a top view.
Figure 12:
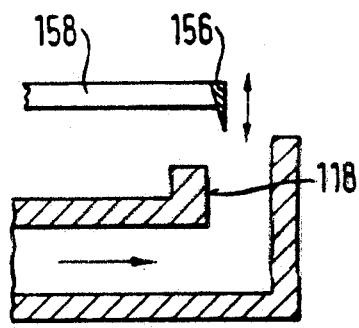
FIG. 12 is a section through another embodiment of a diversion device mounted on the die gap.

While in the embodiments described earlier guide blades 128 and 144 or 228 are located upstream of die gap 118 in annular chamber 120, the guide blade can also be provided directly at die gap 118, as shown in FIGS. 10 to 12.

According to FIG. 10, a guide blade 156, which is approximately wedge-shaped in cross section and is radially adjustable, is fastened in such a way to streamlined retaining arms 158 that it projects with its tip into die gap 118. FIG. 11 shows in a top view an individual guide blade 156 which is adjusted to the curvature of the die gap.

The deflection angle of wedge-shaped guide blade 156 is chosen so that the part of the cooling air stream diverted with the aid of the guide blade is deflected in such a way that it no longer has any cooling effect on film bubble 110. With a smaller deflection angle, there is no separation of the two partial air streams, but merely a widening of the stream. In this case also, there is an influence on the cooling action since the widening of the stream reduces the total flow velocity.

In contrast to the design shown in FIG. 10, in which the radial position of guide blades 156 is varied, the deflection angle of the guide blades can be varied as well. The guide blade can have a streamlined profile instead of a wedge-shaped profile. In addition, it is also possible, in the embodiment shown in FIG. 10, instead of individual segmented guide blades 156, to use one continuous flexible ring with a suitable guide profile so that disturbances in the air flow in the unavoidable spaces between the individual guide blade segments are avoided. Since the radial adjustment paths of retaining arms 158 are only 2 to 30 mm, the guide blade ring can adapt to these adjusting movements through elastic expansion without difficulty. It is advantageous to keep the guide blade ring in the circumferential direction always under a certain tensional stress to avoid uncontrollable bulging of the ring when the radius is reduced.

FIG. 12 shows a modified embodiment in which the guide blades 156 are located above die gap 118. By varying the height of the guide blades above the die gap, the sensitivity of the system can be adjusted.

When guide blade 156 according to FIG. 10 or FIG. 12 is located at the die gap, feedback on the air throughput in the adjacent circumferential areas of the cooling ring can be largely avoided. Although the change in the position of the guide blades results in a change in the flow resistance, it has been found that when the angle of incidence of the guide blades is sufficiently small, for example with an angle of incidence of less than 20°, the flow resistance is so small that no significant feedback occurs.

Figure 13:
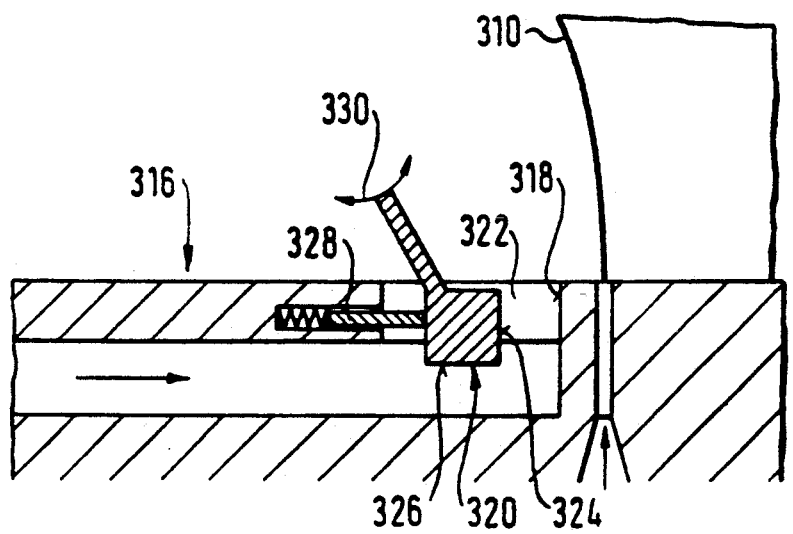
FIG. 13 is a section through a cooling ring with a device for modifying the flowrate at the die gap.

FIG. 13 shows a cooling ring 316 in which a slightly modified principle of the solution according to the invention is implemented. The width of die gap 318 which surrounds film bubble 310 in this embodiment can be varied with the aid of a slide 320. Slide 320 is mounted movably between partitions 322, which divide the die gap into individual segments. One end face 324 of the slide determines the width of die gap 318 while the lower surface 326 of the slide delimits the cross section of the cooling air duct immediately upstream of the die gap.

Slide 320 is pretensioned by a ram 328 to constrict the die gap and is guided by a control curve 330, shown merely symbolically, in a nonlinear movement. If the cooling effect 28 in the segment in question is to be reduced, slide 320 is moved along control curve 330 to the left and downward so that the width of the die gap is increased while the cooling air duct is slightly narrowed by surface 326. Control curve 330 is then chosen so that the total flow resistance and hence the cooling air throughput remains practically unchanged during the movement of slide 320. The decrease in the cooling effect is produced by virtue of the fact that the cooling air leaves the wider die gap 318 at a lower velocity. Conversely, by moving slide 320 in the opposite direction, the die gap can be narrowed and hence the cooling air velocity relative to the film bubble can be increased.

In the embodiment shown in FIG. 13, the narrowing and widening of die gap 318 and the throttling of the cooling air flow in the cooling air channel can be effected by a single component, namely slide 320. Optionally, however, these functions can also be assumed by two separate components whose drives are coupled together mechanically or electronically. In this case, the component that serves to throttle the flow in the cooling air channel can be located further upstream, in other words closer to the outer circumference of the cooling ring.

Figure 14:
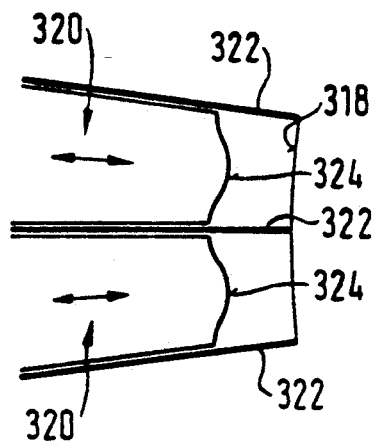
FIG. 14 shows two segments of the die gap in a top view.

FIG. 14 shows die gap 318 of a cooling ring designed using the same principle in a top view. End faces 324 of slide 320 in this example have a corrugated pattern so that die gap 318 is always tapered in the middle between partitions 322. Since the cooling air flow is braked at the surfaces of partitions 322, the velocity distribution of the cooling air always has a maximum in the middle between the partitions, so that a greater cooling effect is produced at this point with a uniform gap width. The shape of end faces 324 reduces the cooling air throughput in these areas, while a higher throughput is obtained in the vicinity of the partitions. As a result, the large throughput and velocity differences are equalized and there remain only locally limited disturbances in the immediate vicinity of partitions 322. However, these disturbances are quickly compensated in the air flow directly above the die gap, so that a uniform throughput and velocity distribution and hence a uniform cooling effect are obtained at the point where the air flow impacts the film bubble.

Slides 320 enjoy a certain amount of play between partitions 322 so that the radial adjusting movement is made possible.

Figure 15:
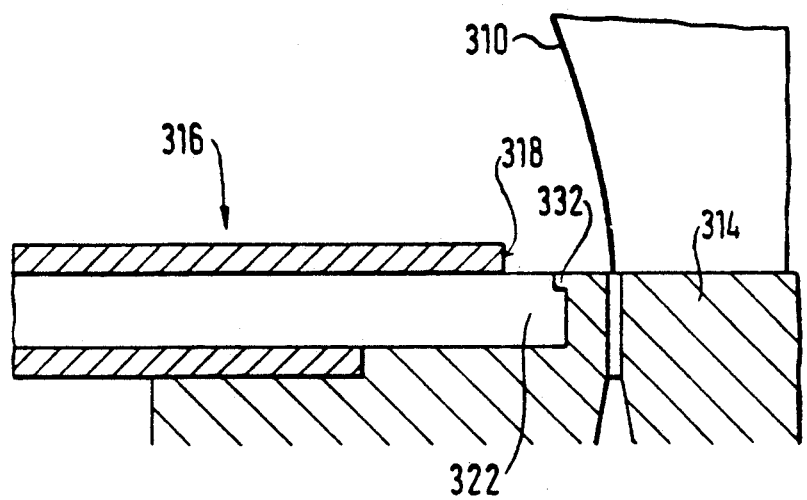
FIG. 15 is a section through a die gap according to another embodiment.
Figure 16:
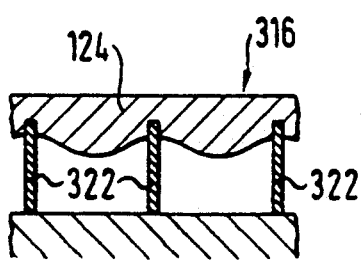
FIG. 16 is a vertical section through the cooling ring immediately upstream of the die gap.
Figure 17:
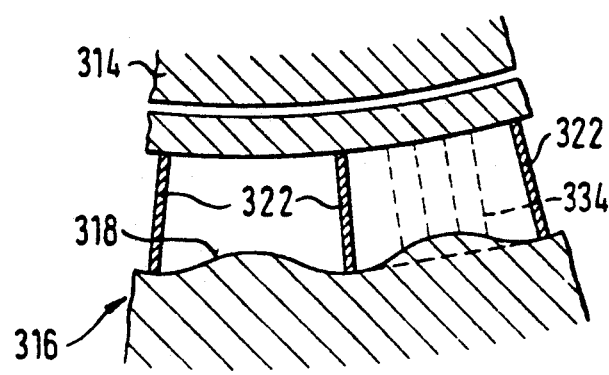
FIG. 17 is a horizontal section through a die gap according to another embodiment.

FIGS. 15 to 17 show measures which serve essentially the same purpose as the arrangement in FIG. 14. In all cases, die gap 318 of the cooling ring is divided by radial partitions 322 into segments so that the cooling air flow at the circumference of the film bubble can be controlled segmentwise by control devices not shown in greater detail.

According to FIG. 15, a turbulence-generating interfering edge 332 is provided at the inner edge of the die gap. The effect of this disturbing edge produces turbulences along the entire circumference of the die gap, said turbulences overlapping the turbulences unavoidably created at partitions 322, resulting in a uniform cooling effect and suppressing the disturbing influences of the partitions. The turbulences created by disturbing edge 323 also result in an improved air exchange at the surface of the film bubble, so that cooling efficiency is increased overall.

In FIG. 15, disturbing edge 232 is formed directly on the part of tool 314 which delimits the die gap. If existing facilities are to be retrofitted with a cooling ring according to the invention, however, the disturbing edge can be formed on a part of cooling ring 316 that forms the inner edge of the die gap.

The embodiments shown in FIGS. 16 and 17 are based on the principle already explained in conjunction with FIG. 14. In FIG. 16, the underside of upper wall 324 of cooling ring 316 is made corrugated, while in FIG. 17 the outer circumferential edge of die gap 318 has a corrugated profile.

The velocity of the cooling air in the segments of die gap 318 delimited from one another by partitions 322 can alternatively be standardized by providing radial ribs 334 between partitions 322 as indicated by the dashed lines in FIG. 17. The ribs reduce the flow velocity inside the segments of the die gap, so that a velocity distribution is created which is uniform in the circumferential direction. The minor disturbances created by the ribs and the partitions are already evened out only a short distance above the die gap.

What is claimed is:

1. Method for regulating the thickness profile of a film bubble in a film-blowing device with a main cooling ring surrounding a film bubble and an additional cooling ring which forms an annular nozzle separate from main cooling ring, the outlet openings of said nozzle terminating in a cooling gas stream discharged by the main cooling ring, wherein:
    (a) a uniform cooling gas stream is supplied over the circumference of the film bubble through the main cooling ring;
    (b) separate cooling gas streams are supplied in different circumferential sections of the film bubble through separate segments of additional cooling ring;
    (c) the film thickness is scanned above the frost line in various circumferential areas; and
    (d) a parameter which determines the cooling power of the cooling gas streams supplied by the additional cooling ring is regulated segmentwise as a function of the measured film thicknesses,
    wherein the regulation of the parameter at one circumferential segment does not substantially affect the cooling achieved at other circumferential segments, and
    wherein one or more of the following parameters is/are used as regulating parameters:
    (d1) the output of a separate cooling gas blower for individual segments of the additional cooling ring;
    (d2) the angle of incidence at which cooling as is discharged from individual segments of the additional cooling ring;
    (d3) the positions of the individual segments of the additional cooling ring relative to circumferential segments of the film bubble;
    (d4) the temperature of the cooling gas discharged through the individual segments of the additional cooling ring.

2. Method for fine correction of the thickness profile of a film bubble in blown film manufacture, in which a cooling gas stream which is uniform over the circumference of a film bubble is produced with a main cooling ring, in which there is automatic measurement of the film thickness at circumferential positions around the circumference of the film bubble, and in which the cooling gas stream discharged by the main cooling ring is modified at individual circumferential positions in response to the thickness measurements, wherein the modification is achieved by a portion of the supplied cooling gas being drawn off at the circumference of the film bubble and suction at individual circumferential positions around the film bubble being varied to increase film thickness uniformity.

3. Device for regulating the thickness of a film bubble in blow film manufacture, comprising an unsegmented main cooling ring surrounding a film bubble, an additional cooling ring forming an annular nozzle subdivided into individual segments and separate from the main cooling ring, said nozzle having a die gap, the die gap terminating in a cooling gas stream discharged by the main cooling ring, and devices for controlling the cooling gas stream in the individual segments in response to automatic measurement of the film thickness around the circumference of the film bubble, said devices being for controlling the cooling gas stream and said devices comprising separate blowers for each individual segment and/or separate adjusting means associated with the individual segments for controlling angle of incidence ($\phi$), the positions of the segment with respect to the bubble surface, or the temperature of the cooling gas, thereby to increase film thickness uniformity.

4. Device according to claim 3, wherein an additional cooling ring forms an annular chamber subdivided by radial partitions, and wherein partitions terminate at the inner edge of the annular chamber in a position at a distance from a die gap which passes through in the circumferential direction.

5. Device according to claim 4, wherein a flow restriction stage common to all segments being located between the inner ends of partitions and die gap.

6. Device according to claim 3, wherein the individual segments of the additional cooling ring are formed by separate gap nozzles, each of which forms a segment of the die gap and whose adjusting angle ($\phi$) is adjustable relative to the main cooling gas stream.

7. Device according to claim 3, wherein the additional cooling ring is mounted on individual bases at a distance above the main cooling ring.

8. Method for manufacturing blown films in a film blowing machine wherein a cooling ring surrounds a film bubble and has an annular die gap for cooling air, in which the cooling air throughput in the individual circumferential areas of cooling ring is controlled to correct the thickness profile of the film bubble, and wherein a portion B of the cooling air is diverted at positions distributed in the circumferential direction of the cooling ring for controlled reduction of the cooling air flow at the film bubble with the air being diverted by adjustable guides or guide blades and wherein the total flow resistance for the diverted and the nondiverted cooling air in the circumferential segment is kept substantially constant independently of the positions of the guide blades.

9. Device for regulating the thickness of a film bubble in blow film manufacture, wherein a cooling ring surrounds a film bubble and has an annular die gap for cooling air, said die gap having a throughput cross section, and wherein the cooling air throughput in the individual circumferential areas of cooling ring is controlled to correct the thickness profile of the film bubble, and wherein a portion of the cooling air is diverted at positions distributed in the circumferential direction of the cooling ring for controlled reduction of the cooling air flow at the film bubble with the air being diverted by adjustable guides or guide blades and wherein the total flow resistance for the diverted and the nondiverted cooling air in the circumferential segment in question is kept substantially constant independently of the positions of the guide blades, wherein the cooling ring has a crown of discharge openings located radially outside the die gap, said discharge openings having throughput cross sections, and wherein the adjustable guides or guide blades are so disposed in the cooling air flow inside the cooling ring that they deflect a portion of the cooling air stream to the discharge openings and, by their adjustment, modify the throughput cross sections of the outlet openings and of the die gap to cause the total flow resistance to remain substantially constant.

10. Device according to claim 9, wherein each discharge opening has a separate guide blade associated therewith, said blade being displaceably guided in an opening in wall of the cooling ring which is provided with a discharge opening.

11. The device according to claim 10, wherein guide blades are designed as flaps which are pivotable around their ends which are at the rear looking in the flow direction, out of the plane of the wall of the cooling ring, into the interior of the cooling ring, and have a guiding contour which is semicircular in cross section on their sides that face discharge opening.

12. The method of claim 8 wherein there are guide blades located in the cooling air flow at or downstream from die gap, the radial position and/or angle of incidence of said blades being controllable.

13. Device according to claim 9 wherein the guide blades are formed by a ring made of flexible material running in the circumferential direction of the cooling ring, the position of said ring and/or its angle of incidence being adjustable by means of rams or retaining arms distributed in the circumferential direction.

14. Method for manufacturing blown films in a film blowing machine with a cooling ring surrounding a film bubble and having an annular die gap for cooling air, in which there is automatic measurement of the film thickness, and in which, in response to the measurements of the thickness of the film bubble, the cooling air flow is controlled in the individual circumferential areas of the cooling ring by segmentwise narrowing or widening of the die gap, wherein at least partial compensation is provided for the change in flow resistance produced by the change in the gap width, with the cooling air flow being throttled in segments upstream of the die gap as a function of the gap width.

15. Device for manufacturing blown films in a film blowing machine with a cooling ring surrounding a film bubble and having an annular die gap for cooling air, in which, to correct the thickness profile of the film bubble, the cooling air flow is controlled in the individual circumferential areas of the cooling ring by segmentwise narrowing or widening of the die gap, wherein at least partial compensation is provided for the change in flow resistance produced by the change in the gap width, with the cooling air flow being throttled in the affected segments upstream of the die gap as a function of the gap width, and wherein the outer edge of the die gap is delimited by radially adjustable slides, wherein a throttling device is associated with each slide, in the cooling air flow upstream of the die gap, said device being coupled drivewise with the slide and being actuated to produce greater throttling of the cooling air flow when the slide is moved in the direction of greater gap width.

16. Device according to claim 15, wherein the die gap is subdivided by radial partitions into individual segments and by the surface of the slide, which delimits the die gap, being made convex in the area between the partitions in such manner that the segment of the die gap has a lesser width in the center than in the vicinity of the partitions.

17. Device according to claim 3, wherein the die gap is subdivided by radial partitions into individual segments and provided with means for equalizing the cooling air flow.

18. Device according to claim 9 or 15, wherein the die gap is subdivided by radial partitions into individual segments and provided with means for equalizing the cooling air flow.

* * * * *

UNITED STATES PATENT AND TRADEMARK OFFICE
CERTIFICATE OF CORRECTION

PATENT NO.   : 5,281,375

DATED        : January 25, 1994

INVENTOR(S)  : Stefan Konermann

It is certified that error appears in the above-identified patent and that said Letters Patent are hereby corrected as shown below:

On the Title Page:

Under [57] ABSTRACT, first line, "film" should be --fine--.

Column 1, between lines 60 and 61 insert --the measured film thickness in the various circumferential--.

Col. 2, line 60, "alr" should be --air--.

Col. 3, line 14, "tilat" should be --that--.

Col. 6, line 61, "henee the stretehing" should be --hence the stretching--.

Signed and Sealed this

Second Day of August, 1994

Attest:

BRUCE LEHMAN

*Attesting Officer*    Commissioner of Patents and Trademarks